(12) United States Patent
Moya, Jr.

(10) Patent No.: US 8,303,126 B2
(45) Date of Patent: Nov. 6, 2012

(54) CELL PHONE STAND

(76) Inventor: Randall Moya, Jr., Long Beach, CA (US)

( * ) Notice: Subject to any disclaimer, the term of this patent is extended or adjusted under 35 U.S.C. 154(b) by 25 days.

(21) Appl. No.: 13/083,577

(22) Filed: Apr. 10, 2011

(65) Prior Publication Data

US 2012/0258774 A1    Oct. 11, 2012

(51) Int. Cl.
*G03B 15/02* (2006.01)
*F16M 11/02* (2006.01)

(52) U.S. Cl. ......... 362/11; 362/88; 362/184; 248/178.1; 396/419

(58) Field of Classification Search .............. 362/11, 362/33, 88, 184, 190, 191, 249.01, 249.02, 362/249.03, 249.1, 249.11, 418, 427; 248/163.1, 248/166, 168, 170, 171, 177.1, 178.1, 187.1, 248/188.1, 188.5, 188.6, 439; 396/419, 420, 396/428

See application file for complete search history.

(56) References Cited

U.S. PATENT DOCUMENTS

| | | | | |
|---|---|---|---|---|
| 2,794,612 | A * | 6/1957 | Clifton | 108/141 |
| 4,904,018 | A * | 2/1990 | Young | 297/4 |
| 5,769,004 | A * | 6/1998 | Kendall | 108/59 |
| 7,789,356 | B1 * | 9/2010 | Jones | 248/178.1 |
| 7,997,753 | B2 * | 8/2011 | Walesa et al. | 362/191 |
| 8,161,890 | B2 * | 4/2012 | Wang | 108/6 |
| 8,181,760 | B2 * | 5/2012 | Trieu | 190/1 |
| 2007/0131825 | A1 * | 6/2007 | Skrodzki | 248/177.1 |
| 2010/0237263 | A1 * | 9/2010 | Walesa et al. | 250/495.1 |
| 2010/0284177 | A1 * | 11/2010 | Lau | 362/184 |

* cited by examiner

*Primary Examiner* — Hargobind S Sawhney
(74) *Attorney, Agent, or Firm* — Michael Ries

(57) ABSTRACT

The present invention is a cell phone stand to secure a cell phone or a camera with video recording capability that includes a plurality of support legs with a plurality of front support legs, a plurality of side support legs and a plurality of back support legs, a cell phone base plate or a camera base plate with a raised perimeter to secure the cell phone or camera that is supported by the support legs. There is also a plurality of rotator cuffs disposed around the base plate to rotate the front support legs and the back support legs under the base plate, a built-in light and one or more batteries housed in a battery casing to provide electric power to the built-in light.

20 Claims, 2 Drawing Sheets

CELL PHONE STAND

TECHNICAL FIELD & BACKGROUND

Cell phones such as Smart phones with video camera capability are often utilized to record and store footage of important information, such as when a teacher records lessons for future use by students. However, there are limited alternatives to stands that are specifically designed for cell phones and cameras that avoid the hassles of inadequate or shaky filming.

The present invention generally relates to a stand. More specifically, the invention is a cell phone stand that can be utilized with a cell phone or a camera with video recording capability.

It is an object of the invention to provide a cell phone stand with a built-in light system that provides illumination in dimly-lit or dark areas.

It is an object of the invention to provide a cell phone stand that allows a person such as a teacher to provide an inexpensive and convenient way to provide online learning demonstrations utilizing a cell phone or camera with video recording capability.

It is an object of the invention to provide a cell phone stand that is easily collapsible and portable.

What is really needed is a cell phone stand with a built-in light system that provides illumination in dimly-lit or dark areas that allows a person such as a teacher to provide an inexpensive and convenient way to provide online learning demonstrations utilizing a cell phone or camera, that is easily collapsible and portable and can be utilized with a cell phone or a camera with video recording capability.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1A:
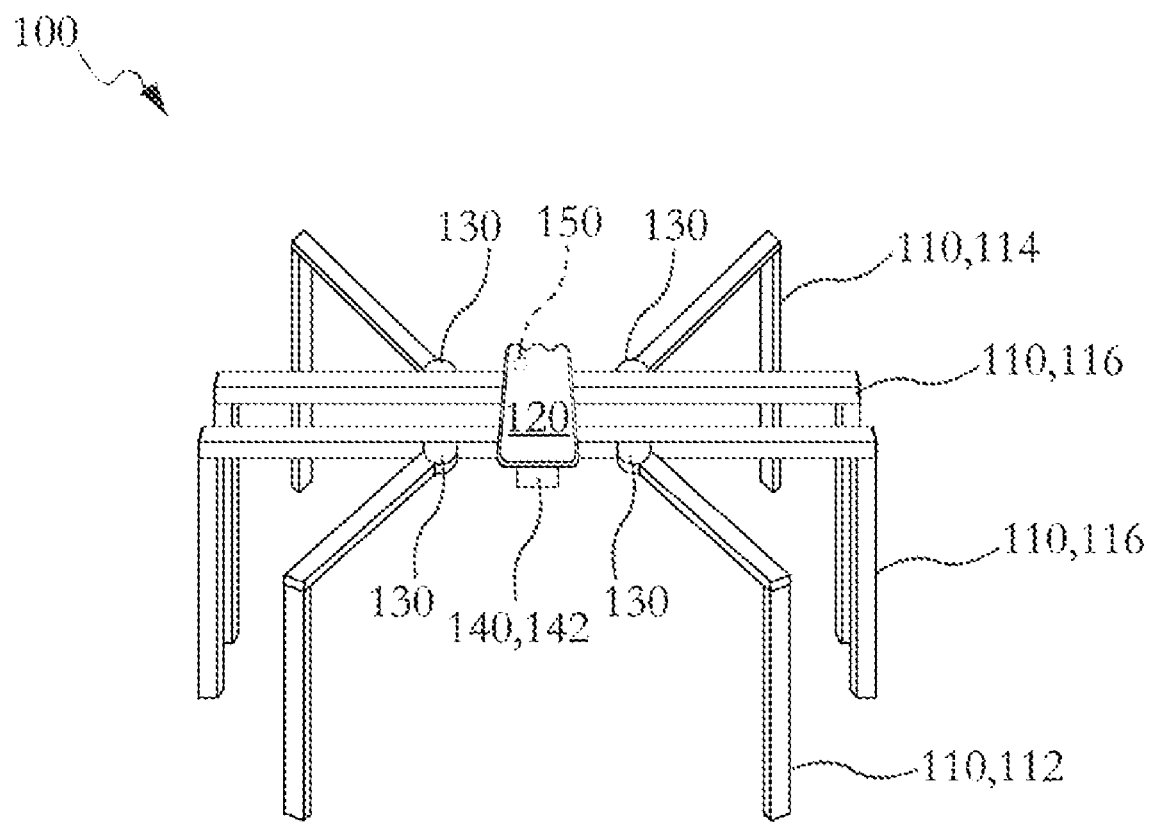
FIG. 1A illustrates an overhead front perspective view of a cell phone stand, in accordance with one embodiment of the present invention.

FIG. 1A illustrates an overhead front perspective view of a cell phone stand 100, in accordance with one embodiment of the present invention. The cell phone stand 100 includes a plurality of support legs 110, a base plate 120, a plurality of rotator cuffs 130, a battery 140 and a built-in light 150. The support legs 110 include 8 support legs, although any suitable number of support legs can be utilized. Once a cell phone or camera with a video recording capability (not shown) has been secured to the base plate 120 that is compatible with that specific cell phone or camera, it can be positioned onto the cell phone stand 100 and utilized for multiple functions, such as video recording. In one embodiment of the invention, the smart phone or camera is placed on top of the cell phone stand 100 and can record video of an object or activity underneath the cell phone stand 100 (i.e., a math problem). The base plate 120 can be sold separately and can be a cell phone base plate or a camera base plate. Also when a user upgrades his cell phone or camera, user must buy a new base plate 120 that can accommodate and attach the upgraded camera or cell phone to the cell phone stand 100.

The rotator cuffs 130 include four rotator cuffs disposed around the base plate 120 and are used to swing and fold the support legs 110 underneath the base plate 120, making the cell phone stand 100 relatively compact and easy to transport together with a cell phone if desired. The battery 140 provides electrical power to the cell phone stand 100 and is housed in a battery casing 142. The battery 140 and battery casing 142 can be disposed anywhere on the cell phone stand 100 and is typically a AAA battery, although any type and number of batteries can be utilized. The built-in light 150 is disposed underneath the base plate 120 to light an object or activity being video recorded by the cell phone or camera, although the built-in light 150 can be disposed anywhere on the cell phone stand 100. The built-in light 150 is electrically powered by the battery 140 and is a bulb light, an LED light or other suitable built-in light.

Figure 1B:
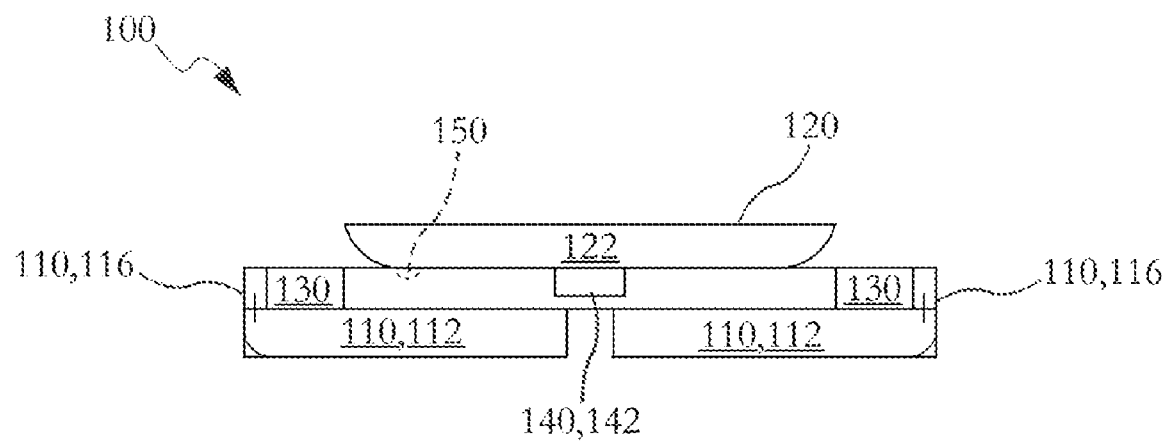
FIG. 1B illustrates a front perspective view of a cell phone stand with a plurality of support legs folded and contracted inward, in accordance with one embodiment of the present invention.

FIG. 1B illustrates a front perspective view of a cell phone stand with a plurality of legs folded and contracted inward, in accordance with one embodiment of the present invention. The support legs 110 include two front support legs 112, two back support legs 114 and four side support legs 116. The front support legs 112 and back support legs 114 can retract, be swung and folded under the rotator cuffs 130 and base plate 120 and side support legs 116 that also fold under can be retracted inward to decrease the overall size of the cell phone stand 100 to enable easy transport and portability. The base plate 120 is centrally positioned on the cell phone stand 100 and has a raised perimeter 122 that can securely hold a cell phone with a video camera capability such as an IPhone™ or other Smartphone or video camera. The battery 140 and built-in light 150 is the same as that illustrated in FIG. 1A and its description.

The cell phone stand 100 offers optimum cell phone and camera stability and is ideal for use by teachers and other persons who record classes and demonstrations and upload them to the Internet where they can be accessible to the general public and anywhere on the Internet (i.e., You Tube). The cell phone stand 100 is best utilized in a dry, well-lit and quite environment. The cell phone stand 100 comes in a wide variety of colors and is made of wood, plastic, or collapsible metal parts for increased portability and ease of use, although other suitable materials can be utilized. The cell phone stand 100 is approximately 8 inches in height, 18 inches in length, and 11 inches in width when unfolded and in use. The base plate 120 is approximately ½" thick and the support legs 110 are ¾" thick and ¾" wide. The support legs 110 are made of metal or other suitable material.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A cell phone stand to secure a cell phone or a camera with video recording capability, comprising:
   a plurality of support legs that include a plurality of front support legs, a plurality of side support legs and a plurality of back support legs;
   a base plate to secure said cell phone or camera that is supported by said support legs;
   a plurality of rotator cuffs to rotate said front support legs and said back support legs under said base plate;
   a built-in light to light an object or activity being video recorded by said cell phone or camera; and
   one or more batteries housed in a battery casing to provide electric power to said built-in light.

2. The stand according to claim 1, wherein said front support legs and said back support legs are retracted, swung and folded underneath said base plate utilizing said rotator cuffs.

3. The stand according to claim 1, wherein said side support legs are folded under and retracted inward.

4. The stand according to claim 1, wherein said base plate has a raised perimeter to secure said cell phone or camera.

5. The stand according to claim 4, wherein said base plate is a cell phone base plate or a camera base plate.

6. The stand according to claim 5, wherein said base plates are upgraded and replaced to accommodate an upgraded cell phone or camera.

7. The stand according to claim 1, wherein said rotator cuffs are disposed around said base plate.

8. The stand according to dam 1, wherein said built-in light is disposed underneath said base plate.

9. The stand according to claim 8, wherein said built-in light is a bulb light or an LED.

10. The stand according to claim 1, wherein said battery is a triple A battery.

11. The stand according to dam 1, wherein said cell phone or camera is secured to said base plate to record video of said object or activity underneath said cell phone stand.

12. A cell phone stand to secure a cell phone or a camera with video recording capability, comprising:
   a plurality of support legs that include a plurality of front support legs, a plurality of side support legs and a plurality of back support legs;
   a cell phone base plate or a camera base plate with a raised perimeter, to secure said cell phone or camera that is supported by said support legs, said base plates are upgradable and replaceable to accommodate an upgraded cell phone or camera;
   a plurality of rotator cuffs disposed around said base plate to rotate said front support legs and said back support legs under said base plate;
   a built-in bulb light or LED light disposed underneath said base plate to light an object or activity being video recorded by said cell phone or camera; and
   one or more batteries housed in a battery casing to provide electric power to said built-in light.

13. The stand according to claim 12, wherein said front support legs and said back support legs are retracted, swung and folded underneath said base plate utilizing said rotator cuffs and said side support legs are retracted inward and folded underneath.

14. The stand according to claim 12, wherein said battery is a triple A battery.

15. The stand according to claim 12, wherein said cell phone or camera is secured to said base plate to record video of said object or activity underneath said cell phone stand.

16. The stand according to claim 12, wherein said cell phone stand is approximately 8 inches in height, 18 inches in length and 11 inches in width when unfolded and in use.

17. A cell phone stand to secure a cell phone or a camera with video recording capability, comprising:
   a plurality of support legs that include a plurality of front support legs, a plurality of side support legs and a plurality of back support legs;
   a cell phone base plate or a camera base plate with a raised perimeter to secure a cell phone or camera that is supported by said support legs, said base plates are upgraded and replaced to accommodate an upgraded cell phone or camera;
   a plurality of rotator cuffs disposed around said base plate to rotate said front support legs and said back support legs under said base plate;
   a built-in bulb light or LED light disposed underneath said base plate to light an object or activity being video recorded by said cell phone or camera; and
   one or more triple A batteries housed in a battery casing to provide electric power to said built-in light.

18. The stand according to claim 17, wherein said front support legs and said back support legs are retracted, swung and folded underneath said base plate utilizing said rotator cuffs and said side support legs are retracted inward and folded underneath.

19. The stand according to claim 17, wherein said base plate is approximately ½ inch thick and said support legs are approximately ¾ inch thick and ¾ inch wide.

20. The stand according to claim 17, wherein said cell phone stand is approximately 8 inches in height, 18 inches in length and 11 inches in width when unfolded and in use.

* * * * *